DIAPHRAGM TYPE FLUID LOGIC LATCH

Filed Feb. 1, 1966

INVENTOR
DONALD F. JENSEN
BY Henry E. Otto Jr.
ATTORNEY

United States Patent Office 3,433,257

Patented Mar. 18, 1969

3,433,257
DIAPHRAGM TYPE FLUID LOGIC LATCH

Donald F. Jensen, Endicott, N.Y., assignor to International Business Machines Corporation, Armonk, N.Y., a corporation of New York Filed Feb. 1, 1966, Ser. No. 524,166
U.S. Cl. 137—561 7 Claims
Int. Cl. E03b *7/07;* F17d *3/00;* F16k *31/145*

ABSTRACT OF THE DISCLOSURE

An arrangement of diaphragm-controlled valves, flow restrictors and ducts for fluid providing a bistable logic device which can be switched from one state to another in response to short fluid signals of switching pressures that are determined according to a preselectable hysteresis pattern.

Figure 1:
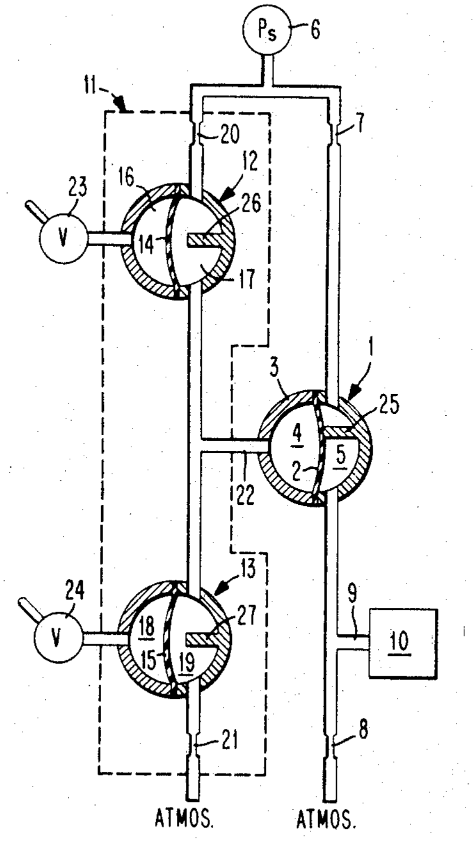

It has heretofore been proposed to provide a bistable device, such as a latch, which, like its electronic counterpart, relies upon feedback between two associated similar elements to provide an output signal of one level or another level indefinitely in response to a short set or reset pulse, respectively. Devices of this type operate satisfactorily so long as the set or reset pulses are of sufficient duration. However, it has been found that an unduly short pulse can place the latch in a state of self-sustained oscillation in which it gives a spurious output without positively assuming one or the other of its stable states. These oscillations arise because of the inherent delay in conveying feedback signals between the associated elements of the latch. This undesirable oscillation may also arise where the latch is responsive to a coincidence of two pulses (e.g., an input pulse and a timing pulse). If these pulses are of different frequencies, as will usually be the case, the overlap of these pulses will be of random length, and may produce a resultant or coincident pulse of insufficient duration.

One object of this invention is therefore to provide an improved bistable device which will switch reliably and without oscillation in response to pulses which may be shorter than those in latch devices heretofore proposed.

Another object is to provide a bistable device which will be switched from one stable state to the other stable state at one ratio of control pressure to supply pressure and will be switched back to said one state at a substantially different ratio of control pressure to supply pressure.

A further object is to provide a bistable device of the type described in the preceding object wherein the control pressure normally is at a preselected value within a prescribed range of values, thus providing a hysteresis loop-like operation whereby switching will only occur when control pressure is caused to vary above or below such range.

According to these objects, the fluid-controlled apparatus embodying the invention comprises a bistable device including a flexible diaphragm seatable against a ridge in a chamber by a control fluid pressure above a normal range. When seated, the diaphragm blocks fluid flow from a pressure source via said chamber in parallel to a delivery duct and also via a bleed choke to an outlet, such as atmosphere. The partition is offset in an upstream direction relative to the diaphragm axis an extent corresponding to the degree to which it is desired that control pressure must be reduced before the diaphragm can unseat. The flow capacities of the bleed choke, and also of any supply choke that may be interposed between the source and chamber, determine the proportion of supply pressure obtainable as a maximum delivery pressure in the duct, and hence establish the extent that control pressure must be increased to seat the diaphragm if it is unseated.

A control device normally maintains control pressure at a preselected value within said range, sufficient to retain the diaphragm seated, if already seated, but insufficient to shift it to seating position if unseated. This control device responds to pneumatic or electrical pulses or signals to vary the control pressure. As illustrated, a set pulse will initiate a decrease in control pressure and hence cause unseating of the diaphragm to provide the high level of delivery pressure; whereas a reset pulse will effect a control pressure increase for seating the diaphragm to provide the low level of delivery pressure. In the absence of either pulse, the control device will maintain control pressure at said preselected value for latching the diaphragm in the existing one of its two stable positions to which it is actuated in each case by snap action to provide reliable operation.

Figure 2:
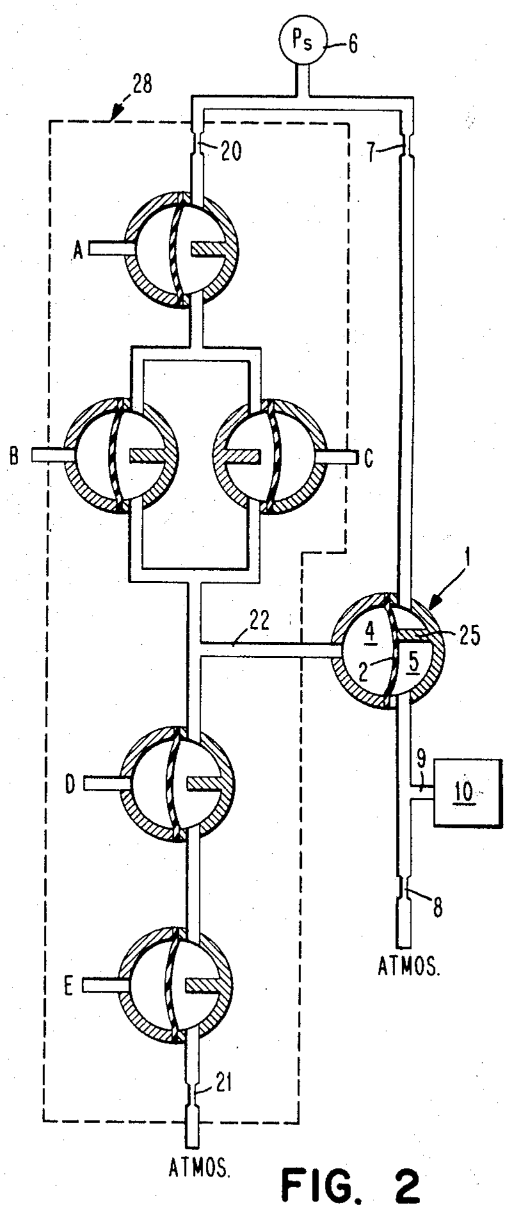
Figure 3:
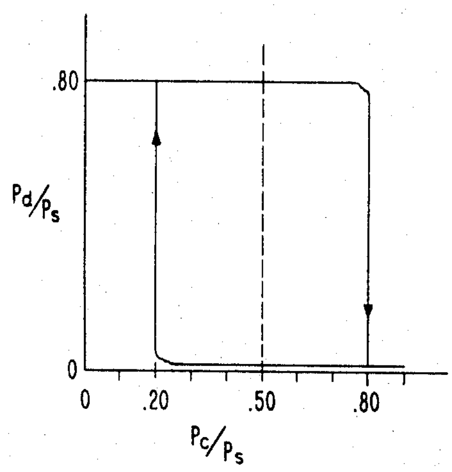

Other objects and advantages will become apparent from the following more detailed description of the invention and from the accompanying drawing, wherein:

FIG. 1 is a schematic drawing of a fluid-controlled bistable apparatus embodying the invention;

FIG. 2 is a plot of delivery pressure to supply pressure rates (*Pd/Ps*) vs. control pressure to supply pressure rates (*Pc/Ps*) showing the hysteresis pattern by which delivery pressure is shifted between its two stable levels responsively to changes in control pressure from a normal preselected value; and FIG. 3 is a schematic drawing of a modified embodiment of the invention showing a control device capable of performing set and reset functions in response to prescribed sets of relatively complex logical conditions.

*Description*

As illustrated in FIG. 1, the fluid pressure-controlled apparatus embodying the invention comprises a latch device 1 having a flexible diaphragm 2 suitably clamped about its outer periphery between sections of a casing 3. At opposite sides of diaphragm 2 are a control chamber 4 and a chamber 5. Chamber 5 forms part of a flow path via which pressure fluid may flow from a suitable supply source 6 via a choke 7 to said chamber and thence via a choke 8 to an outlet, such as the atmosphere. Extending laterally from the path at a point between chamber 5 and choke 8 is a delivery duct 9 that leads to a suitable device 10 or closed chamber in which pressure of fluid is to be controlled.

Pressure fluid in control chamber 4 is controlled by a control device 11. As illustrated, device 11 comprises a set device 12 and a reset device 13 of identical configuration comprising flexible diaphragms 14 and 15 clamped about their respective outer peripheries between corresponding casing sections. At opposite sides of diaphragm 14 are chambers 16 and 17; and at opposite sides of diaphragm 15 are chambers 18 and 19. Pressure fluid normally may flow from an inlet, such as source 6, to an exit, such as the atmosphere, via a flow path including a choke 20, chambers 17 and 19, and a choke 21. A control conduit 22 extends laterally from this path at a point between chambers 17 and 19 for conveying pressure fluid to control chamber 4. For sake of simplified illustration, manually operable three-way valves 23 and 24 are shown for controlling pressures of fluid in set and reset chambers 16 and 18, respectively.

In operation, assume chambers 16 and 18 are concurrently vented by valves 23 and 24, respectively; and that diaphragm 2 is sealingly seated against a transverse ridge 25 that partitions chamber 5 into upstream and downstream portions. Assume further that chokes 20 and 21 are of equal flow capacity and that choke 7 has a flow capacity approximately four times that of choke 8.

Under the assumed conditions, the respective diaphragms 2, 14 and 15 will be in the positions in which they are shown in FIG. 1. Pressure fluid will flow from source 6 via choke 20 and chamber 17 to control conduit 22 for providing in control chamber 4 a control pressure of a preselected value. This value (denoted by the broken line in FIG. 3) corresponds to half the magnitude of the supply pressure from source 6, in view of the continous bleed of pressure fluid to atmosphere via choke 21 and the assumed equal flow capacities of chokes 20 and 21. This preselected value of control pressure is sufficient to retain the diaphragm 2 sealingly seated against ridge 25; but, for reasons to be understood from subsequent description, such control pressure would be insufficient to seat said diaphragm against said ridge if it were not already seated.

If a temporary set pulse is now supplied to set chamber 16 in device 12, diaphragm 14 will sealingly seat against a central ridge 26 in chamber 17 for terminating flow of pressure fluid from source 6 to control conduit 22 and causing said conduit to be vented via choke 21. As control pressure in chamber 4 thus drops toward zero, fluid at full supply pressure in the upstream portion of chamber 5 (i.e., above ridge 25) and acting over the corresponding small area of diaphragm 2 will eventually become effective to unseat said diaphragm slightly from the ridge; whereupon pressure in chamber 5 will immediately become effective over the full area of the diaphragm, causing it to snap leftward, as viewed in FIG. 1, by a snap-acting movement to an unseated position. The particular value of control pressure at which such snap action is initiated is determined by the degree ridge 25 is offset relative to the axis of diaphragm 2; i.e., the more it is offset in an upstream direction, the lower value to which control pressure must be reduced before the diaphragm starts to snap to unseated position.

With diaphragm 2 in unseated position, pressure fluid will flow from source 6 to duct 9 for providing a delivery pressure that is a preselected percentage of supply pressure. With the assumed ratio of flow capacities of chokes 7 and 8, delivery pressure will thus be approximately eighty percent of supply pressure from source 6.

When the set pulse ends or is terminated and chamber 16 is vented, control pressure will be restored to said preselected value via communications previously described; but control pressure (which will now rise to its normal value of half of the supply pressure) acting in chamber 4 over the full area of diaphragm 2 will be insufficient to overcome the opposing effect on the diaphragm of pressure in chamber 5 (now eighty percent of supply pressure) acting over the full area of the diaphragm. Hence, diaphragm 2 will remain in unseated position after the set pulse terminates.

If a temporary reset pulse is now supplied to reset chamber 18, diaphragm 15 will sealingly seat against a central ridge 27 in chamber 19 for terminating the bleed of pressure fluid from conduit 22 to atmosphere via choke 21; and hence pressure fluid from source 6 will flow via and at the rate controlled by choke 20 to conduit 22 for causing control pressure in chamber 4 to increase toward full supply pressure. When control pressure in chamber 4 increases sufficiently, it will shift diaphragm 2 slightly toward ridge 25. Once this movement is initiated, the diaphragm 2 will immediately snap all the way in to seating contact with the ridge by a snap-acting movement resulting from the progressive pinching off of fluid flow over the ridge and consequent progressive reduction in effective pressure in the downstream portion of chamber 5. With diaphragm 2 seated, delivery duct 9 will be vented at the rate controlled by choke 8.

When the reset pulse is terminated, control pressure will be restored to its illustrative preselected value of one-half full supply pressure; and diaphragm 2 will be maintained seated until the next succeeding set pulse.

It will now be seen, by reference to FIG. 3, that control pressure in chamber 4 is normally maintained at a preselected value (such as one-half full supply pressure) within a wide range; and that unless delivery control pressure is temporarily reduced below or increased above said range, the diaphragm 2 will remain in its existing position indefinitely. Thus the apparatus according to the invention operates as a latch device to provide one or the other of two levels of delivery or output pressure indefinitely until switched by a pulse of short duration. It will be understood that, the normal preselected value of control pressure may be modified by varying the relative flow capacities of chokes 20 and 21; e.g., if the flow capacity of choke 20 is twice that of choke 21, the normal control pressure obtained when the set and reset chambers are vented will be substantially two-thirds (rather than one-half) full supply pressure.

It should also be noted that choke 7 preferably is provided when the control device 11 and latch device 1 are supplied with pressure fluid from the same source 6, as shown, (or with fluid from different sources providing equal supply pressures) in order to assure more rapid seating of diaphragm 2 in response to an increase in control pressure in chamber 4. For example, assuming in the embodiment illustrated that choke 7 were eliminated and there was substantially no impedance upstream of choke 8, all pressure drop would occur across choke 8 and the pressure in chamber 5 would be equal to full supply pressure Ps with diaphrgam 2 unseated; and hence to seat diaphragm 2, pressure in chamber 4 would have to increase to full supply pressure. Since chamber 4 (with diaphragm 15 seated) will charge via choke 20, it will asymptotically approach full supply pressure Ps and be undesirably slow in initiating operation of the diaphragm 2 to seated position. It has been found that fast response and stable operation are obtained by having choke 7 restrict the pressure in chamber 5 to about .8 Ps when diaphragm 2 is unseated. Of course, choke 7 may be physically eliminated if device 1 is supplied with fluid from a source of fluid at correspondingly lower pressure or if there is sufficient inherent impedance in the system (such as by use of smaller diameter ducting) to restrict pressure in chamber 5 to .8 Ps when diaphragm 2 is unseated. In practice, the desired delivery pressure upper level will determine how much higher the supply pressure should be to the control device 11.

In the modified embodiment of the invention shown in FIG. 2, control device 11 has been eliminated and replaced by a control device 28, which controls the latching function according to a more complex set of logical conditions. As illustrated, device 28 comprises five devices that are structurally identical with each other and with devices 12 and 13 and have respective input lines A, B, C, D and E to which pressure fluid pulses may be supplied via suitable means (not shown). Thus, set pulses to A alone or else concurrently to B and C will perform the "set" function whereby control chamber 4 is vented for causing maximum delivery pressure to be provided indefinitely in duct 9 until a "reset" function is performed by selectively supplying a reset pulse to D or E for causing control chamber 4 to charge sufficiently to cut off supply of pressure fluid to duct 9 and cause the latter to become and remain vented until the "set" function is again performed.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A fluid-controlled apparatus comprising:

means including a chamber and flow restrictor defining one path for pressure fluid to flow from a source to an outlet;

a delivery duct branching from said one path at a point between chamber and restrictor;

a control conduit;

a bistable device including movable abutment means subject opposingly to fluid pressures in said conduit and chamber and operable to one position when conduct pressure exceeds a preselected range of values to terminate flow from the source to the duct and vent said duct via said restrictor, and operable to another position when conduit pressure is reduced below said range to permit flow of pressure fluid from the source to said duct; and control means connected to said conduit and responsive to one or the other of two signals selectively to provide control pressures respectively below and above said preselected range, and responsive to the concurrent absence of both such signals to provide a control pressure within said range which is sufficient to retain said movable abutment means in said one position but insufficient to shift it to said one position from said other position.

2. A fluid-controlled apparatus according to claim 1, including:

means including two spaced chambers disposed between two flow restrictors defining another path for pressure fluid to flow from an inlet to an exit; and wherein said conduit extends from a point between said two chambers to said movable abutment means; and said control means comprises means responsive to said one signal to terminate flow through one of said two chambers to disconnect said conduit from the inlet and cause the conduit to vent via the exit, and responsive to said other signal to terminate flow through the other of said two chambers to disconnect said conduit from the exit and cause said conduit to be charged to inlet pressure, and said two restrictors being of such preselected flow capacities as to provide a desired value of conduit pressure within said range during concurrent absence of both pulses.

3. A fluid-controlled apparatus according to claim 1, including:

partition means against which said movable abutment means is seatable when in said one position and from which it is unseated when in said other position, said partition means being disposed in said chamber in offset relation to the axis of the abutment means to an extent predetermined to establish the degree to which control conduit pressure must be reduced before source pressure acting over the small area of the movable abutment means upstream of the partition means will be sufficient to initiate snap-acting movement of the movable abutment means to its said other position.

4. Fluid-controlled apparatus comprising:

means defining a first flow path for fluid from an inlet to an outlet and a chamber in said path through which said fluid flows, said chamber having at least one wall therein;

a member arranged to divide said chamber into a control compartment and a flow compartment, and movable between a first position and a second position in response to the greater of opposing fluid forces in said two compartments, said member engaging a portion of said wall in said second position to block flow through said flow compartment and subdivide the area of said member therein into an area subject to pressure upstream and an area subject to pressure downstream from said wall portion;

flow restriction means for maintaining fluid in said flow compartment at a pressure intermediate the inlet and outlet pressures when said member is in said first position;

means for maintaining fluid in said control compartment at a predetermined pressure which produces a force against said member less than the opposing force resulting from said intermediate pressure with said member in said first position, but greater than the opposing force resulting from the sum of upstream and downstream pressures with said member in said second position, said control force being independent of said member's position;

means selectively operable to vary the value of one of the opposing fluid pressures in said pressure maintaining means and said flow compartment to move said member to said first position from said second position, and to move said member from said second position to said first position; and an output conduit connected to said first flow path for providing an indication of the pressure in said path.

5. Apparatus as described in claim 4 wherein:

said selectively operable means comprises means for varying the pressure of said maintaining means for increasing the force of fluid on said member to an amount sufficient to move said member to said second position, and for decreasing the force of fluid on said member in said second position to an amount sufficient to permit said member to move to said first position.

6. Apparatus as described in claim 4 wherein:

said maintaining means comprises means defining a second flow path for pressurized fluid from an inlet to an outlet, a duct connecting said second path to said control compartment, and flow restricting means for maintaining the pressure required for said control compartment.

7. Apparatus as described in claim 6 wherein:

said selectively operable means comprises at least a pair of chambers in said second flow path, each having a wall therein and one being located upstream and one located downstream from said duct, and each having a member therein movable from a retracted position to an extended position against said wall in response to input signals and block fluid flow therethrough, whereby either inlet or outlet pressure of said second path can be established at said duct.

References Cited

UNITED STATES PATENTS 3,318,329 5/1967 Norwood ----------- 137—599

OTHER REFERENCES

IBM Techincal Disclosure Bulletin, vol. 7, No. 3, August 1964, pp. 213–214 and vol. 8, No. 3, August 1965, pp. 427–428.

ALAN COHAN, *Primary Examiner.*

DENNIS H. LAMBERT, *Assistant Examiner.*

U.S. Cl. X.R.

137—599; 251—45